United States Patent
Kameda et al.

[19]
[11] Patent Number: 5,955,391
[45] Date of Patent: *Sep. 21, 1999

[54] CERAMIC MATRIX COMPOSITE AND METHOD OF MANUFACTURING THE SAME

[75] Inventors: Tsuneji Kameda, Tokyo; Shoko Suyama, Yokohama; Akio Sayano, Yokohama; Masahiro Asayama, Yokohama; Yoshinori Hayakawa, Machida, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,248

[22] Filed: Mar. 28, 1997

[30] Foreign Application Priority Data

Mar. 29, 1996 [JP] Japan .................................. P8-077795
Mar. 29, 1996 [JP] Japan .................................. P8-077796
Mar. 30, 1996 [JP] Japan .................................. P8-103653

[51] Int. Cl.⁶ .................................................. C04B 35/56
[52] U.S. Cl. ........................... 501/88; 428/384; 428/387; 428/698; 428/699; 428/704; 264/626; 427/226; 427/255.1; 427/255.38; 427/255.294; 204/192.28; 204/192.37
[58] Field of Search .............................. 501/88; 428/698, 428/384, 387, 378, 699, 704; 264/626; 427/226, 255.1, 255.38, 255.294; 204/192.28, 192.37

[56] References Cited

U.S. PATENT DOCUMENTS

| | | | |
|---|---|---|---|
| 4,642,271 | 2/1987 | Rice | 428/698 |
| 4,944,904 | 7/1990 | Singh et al. | 269/60 |
| 5,021,367 | 6/1991 | Singh et al. | 501/88 |
| 5,290,737 | 3/1994 | Andersson et al. | 501/35 |
| 5,296,311 | 3/1994 | McMurtry et al. | 428/688 |
| 5,316,851 | 5/1994 | Brun et al. | 428/379 |
| 5,330,854 | 7/1994 | Singh et al. | 428/698 |
| 5,376,427 | 12/1994 | Singh et al. | 428/110 |
| 5,387,299 | 2/1995 | Singh et al. | 427/419.7 |
| 5,484,655 | 1/1996 | Lau et al. | 428/367 |
| 5,552,352 | 9/1996 | Brun et al. | 501/88 |

FOREIGN PATENT DOCUMENTS

| | | |
|---|---|---|
| 519644 | 12/1992 | European Pat. Off. . |
| 406116036 | 4/1994 | Japan . |
| 2250 516 | 6/1992 | United Kingdom . |

*Primary Examiner*—Paul Marcantoni
*Attorney, Agent, or Firm*—Finnegan, Henderson, Farabow, Garrett & Dunner, L.L.P.

[57] ABSTRACT

In fiber composite ceramic containing reaction sintered SiC as a matrix and having BN-coated SiC continuous fibers as composite fibers, the thickness of the BN coating need not be especially made large, and a sliding effect during growing of cracks can be improved, i.e., breakdown energy can be increased. A method of manufacturing fiber composite ceramic in which large number of BN-coated SiC fibers covered with a BN coating are gathered to form yarns, or yarns are woven to form a two-dimensional or three-dimensional fabric, and a preform is formed by the yarns or the fabric, C powder is arranged in a gap portion between fibers of the preform to form a compact, a molten Si is impregnated into the compact to form an SiC matrix between fibers. A region having a high B concentration is formed around the SiC fibers before the preform is impregnated with the molten Si, and B in the region is solid-solved in Si during reaction sintering to suppress B in the BN-coated SiC fibers from being solid-solved in Si.

6 Claims, 2 Drawing Sheets

CERAMIC MATRIX COMPOSITE AND METHOD OF MANUFACTURING THE SAME

BACKGROUND OF THE INVENTION

1. Field of the Invention

The present invention relates to a ceramic matrix composite obtained by combining ceramic fibers having a coat layer such as a sliding coat layer or a protective reaction barrier layer with a matrix containing SiC as a main component and to a method of manufacturing the ceramic matrix composite and, more particularly, to a ceramic matrix composite in which SiC of a matrix is formed by reaction sintering, fibers and/or a coat layer is suppressed from being eluted in the matrix during the reaction sintering to prevent a sliding function from being degraded and to increase breakdown energy, thereby designing a sound composite system, and to a method of manufacturing the ceramic matrix composite.

2. Description of the Related Art

In general, a ceramic sintered body has strength which is less degraded up to a high temperature, and is more excellent than a conventional metal material in hardness, electric insulating properties, abrasion resistance, corrosion resistance, light-weight properties, and the like. For this reason, the ceramic sintered body is popularly used in a large field as an electronic material or a structure material such as a heavy electric equipment part, an aircraft part, an automobile part, an electronic equipment, a precision instrument, or a semiconductor device material.

However, the ceramic sintered body is easily affected by tensile stress rather than compression stress, and, especially, the ceramic sintered body is broken by the tensile stress at once. That is, the ceramic sintered body disadvantageously has so-called high brittleness. For this reason, in order to make it possible to apply a ceramic part to a portion whose reliability should be high, high toughness of the ceramic sintered body or an increase in breakdown energy are strongly demanded.

More specifically, a ceramic structure part used as a gas turbine part, an aircraft part, an automobile part, or the like requires high heat resistance, high refractory, and high reliability. In order to reply to this demand, studies for realizing the following ceramic composite material have advanced in domestic and foreign laboratories. That is, the ceramic composite material is improved on a breakdown toughness value, a breakdown energy value, or heat resistance, and impact strength in such a manner that composite elements such as a whisker, a blade, and particles are dispersed in a matrix sintered body to be combined with each other.

As such a ceramic composite material which is excellent in refractory characteristics, a ceramic matrix composite obtained by combining ceramic fibers with a ceramic matrix containing silicon carbide (SiC) as a main component especially attracts attention. In particular, a ceramic matrix composite obtained by combining SiC fibers with an SiC matrix attracts attention with respect to its general-purpose properties. A large number of SiC continuous fibers are gathered with each other to form yarns, and the yarns are two-dimensionally or three-dimensionally woven to form a fabric. The yarns or fabric can be applied to various shaped parts. However, in this composite ceramic material, the matrix and the continuous fibers consist of the same material, i.e., SiC. For this reason, the matrix and the continuous fibers may be disadvantageously separated on the same plane.

More specifically, in the ceramic matrix composite, it is very important to properly control the interfacial crystal force between the matrix and the fibers. If the interface state is not proper, the fibers are brought into tight contact with the ceramic, composite effects such as pullout or bridging cannot be performed, breakdown caused by brittleness easily occurs.

In recent years, as a countermeasure against the above problem, it is known that a sliding coat layer is effectively formed on the surface of fibers to exhibit sliding between the fibers and a matrix. More specifically, the following technique has been developed. That is, a coat layer consisting of a material other than that of SiC fibers is formed on the SiC fibers and used as a sliding coat layer, so that the fibers are easily pulled out of the matrix during growing of cracks to improve breakdown energy. As a coat layer suitable for the SiC fibers, boron nitride (BN) may be used. The present inventor has examined various types of sliding coat layers.

However, even if only such a sliding coat layer is formed, when a matrix is formed by reaction sintering, the sliding coat layer is disadvantageously deteriorated or eliminated. In particular, a reaction sintering method for causing a preform consisting of ceramic fibers to be impregnated with molten Si, performing reaction sintering between the molten Si and C powder with which the preform is impregnated, and forming a matrix containing SiC as a main component is applied, the reactive molten Si may react with the BN layer to elute B generated by decomposing the BN layer into the matrix, thereby eliminating the BN layer, and the SiC fibers themselves may be eluted.

In contrast to this, the following conventional technique is also be proposed. That is, a sliding coat layer of a fiber surface is further coated to form a barrier layer serving as a protective reaction layer for suppressing reaction between a matrix and the fibers. However, even if this barrier layer is formed, it is difficult to completely prevent the fibers from being eluted in the matrix material.

On the other hand, as the method of forming an SiC matrix, a CVI method, a precursor method, a powder sintering method, or the like is available. A reaction sintering method in which a melted metal is impregnated into a fiber preform to perform reaction sintering attracts attentions as a method which is suitable for mass-production. In this reaction sintering method, a carbon (C) powder is arranged into gaps between the fibers of the preform using SiC fibers, and a molten silicon (Si) is impregnated into the resultant compact to perform a reaction, thereby forming an SiC matrix. According to the reaction sintering method, a continuous fiber composite ceramic can be manufactured in relatively easy steps, and the product has excellent mechanical characteristics at a high temperature. In reaction sintering, the matrix rarely contracts, so that the matrix can be easily combined with the continuous fibers.

For this reason, a ceramic matrix composite which employs BN-coated SiC fibers as a composite material and employs reaction sintered SiC as a matrix is considerably expected.

However, when a ceramic matrix composite containing SiC as a matrix is manufactured by reaction sintering using BN-coated SiC fibers as a composite material, a sufficient sliding effect cannot be always obtained, and the matrix and fibers are often separated from each other on the same plane during growing of cracks. The separation on the same plane is conspicuous when the BN coating is thin, and the separation on the same plane tends to decrease as the coating thickness is increased. However, when the thickness of the BN coating is increased, an increase in cost is caused. The increase in cost prevents the ceramic matrix composite from being realized.

SUMMARY OF THE INVENTION

The present invention has been made in consideration of the above circumstances, and has as its object to provide a material in which ceramic fibers are combined with a ceramic matrix containing SiC as a main component and formed by reaction sintering, and a sliding coat layer for decreasing the bonding force between the fibers and the matrix to perform sliding is formed on the surface of the fibers as a coat layer, elution of the coat layer during the reaction sintering is effectively suppressed so that the fibers and the coat layer are present in the matrix in a sound state.

It is another object of the present invention to provide a ceramic matrix composite containing reactive sintered SiC as a matrix and having BN-coated SiC fibers as composite fibers, in which the thickness of the BN coating need not be especially increased, and a sliding effect during growing of cracks is improved, i.e., breakdown energy is increased.

It is still another object of the present invention to sufficiently suppress a reaction between a matrix component and a fiber component, so that a composite effect such as bridging or pullout can be performed.

When the present inventor has examined various measures for suppressing a coat layer from being eluted in molten Si serving as a matrix formation material obtained by reaction sintering, the following findings could be obtained. That is, when molten Si having high reactivity was brought into direct contact with fibers without any change, a reaction between the molten Si and the fibers occurred through even a protective reaction barrier layer, and it was very difficult to completely suppress the elution.

For this reason, the present inventor found the following measure as a countermeasure. That is, when a reactive eluted material was heterogeneous or homogeneous to the coating material of fibers was combined with molten Si serving as a matrix formation material during reaction sintering, and the molten Si is set in a reaction saturation state, reactive elution into Si of the coat layer could be prevented.

If elution into Si of the coat layer caused by a reaction can be suppressed by the above means, fibers which are coated with only a sliding layer can be present in the matrix in a sufficient sound state. In addition, when a protective reaction barrier layer is formed, soundness may be further improved.

On the basis of the above knowledge, according to another aspect of the present invention, there is provided a ceramic matrix composite in which ceramic fibers are combined with a ceramic matrix containing SiC as a main component and formed by reaction sintering, and a sliding coat layer for decreasing the bonding force between the fibers and the matrix to perform sliding is present on the surface of the fiber, characterized in that a reactive eluted component whose amount is saturated with respect to Si and which is generated by a reaction between the matrix and Si during reaction sintering is present in the matrix.

According to the ceramic matrix composite as described above, since the reactive eluted component whose amount is saturated with respect to Si and which is generated between the matrix and Si during reaction sintering is present in the matrix, the sliding coat layer is suppressed from being eluted in molten Si, the fibers and the sliding coat layer are left in a sound state, and predetermined toughness against breakdown can be obtained. This ceramic matrix composite can be manufactured by the following manufacturing method.

More specifically, a preform constituted by ceramic fibers is impregnated with molten Si, and reaction sintering between C powder with which the preform is impregnated in advance and the molten Si is performed, so that the fibers are combined with the matrix containing SiC as a main component. A sliding coat layer for decreasing the bonding force between the fibers and the matrix to perform sliding is formed on the surface of the fibers constituting the preform in advance, and a sliding coat layer decomposing component eluted by a reaction between the molten Si and the sliding coat layer is added in Si in advance during reaction sintering of the molten Si, so that the sliding coat layer is suppressed from being eluted in the molten Si.

According to this method, the ceramic matrix composite in which a sliding coat layer is suppressed from being eluted in molten Si can be effectively manufactured.

According to still another aspect of the present invention, there is provided a ceramic matrix composite in which ceramic fibers are combined with a ceramic matrix formed by reaction sintering and containing SiC as a main component, a sliding coat layer for decreasing a bonding force between the fibers and the matrix to perform sliding and a barrier layer for coating the outside of the sliding coat layer to suppress a reaction with Si are present on the surface of the fibers as a multi-layered coating, characterized in that a reactive eluted component whose amount is saturated with respect to Si and which is generated between the matrix and Si during reaction sintering is present in the matrix.

According to the ceramic matrix composite with the above arrangement, since the reactive eluted component whose amount is saturated with respect to Si and which is generated between the matrix and Si during reaction sintering is present in the matrix, the barrier layer or the sliding coat layer is suppressed from being eluted in molten Si, the fibers and the sliding coat layer are left in a sound state, and higher toughness against breakdown can be obtained.

This ceramic matrix composite can be manufactured by the following manufacturing method.

More specifically, a preform constituted by ceramic fibers is impregnated with molten Si, and reaction sintering between C powder with which the preform is impregnated in advance and the molten Si is performed, so that the fibers are combined with the matrix containing SiC as a main component. A sliding coat layer for decreasing the bonding force between the fibers and the matrix to perform sliding and a barrier layer for coating the sliding coat layer to suppress a reaction with Si are formed on the surface of the fibers constituting the preform in advance, and a sliding coat layer decomposing component eluted by a reaction between the molten Si and the sliding coat layer or the barrier coat layer is added in Si in advance during reaction sintering of the molten Si, so that the sliding coat layer and the barrier layer is suppressed from being eluted in the molten Si.

According to this method, the ceramic matrix composite in which a sliding coat layer or a barrier layer is suppressed from being eluted in molten Si can be effectively manufactured.

In the ceramic matrix composite according to the present invention, the sliding coat layer preferably consists of at least one selected from the group a pure metal, an alloy, a metal oxide, a metal nitride, a metal carbide, a meal boride, and these compound, and a reactive eluted component which is present in the matrix and whose amount is saturated with respect to Si consists of a positive metal element, carbon, boron, or a material consisting of at least one of the elements.

In this case, according to a preferable aspect, a metal boride constituting the sliding layer is BN, and the reactive eluted component which is present in the matrix is a B alloy.

In the ceramic matrix composite in which the fiber surface is coated with a multi-layer coating, according to a preferable aspect, a barrier layer constituting the multi-layer coating consists of SiC, C, Mo, or MoSi2.

In the ceramic matrix composite according to the above invention, according to another preferable aspect, a component contained in Si of the matrix is Ti, V, Cr, Zr, Nb,Mo, Hf, Ta, W, or an alloy of one of these elements.

When a material on a cut surface is analyzed in a sample in which a matrix and fibers are cut from each other on the same plane, a BN layer covering SiC fibers is extremely decreased in thickness for the following reason. That is, since the reactivity of molten Si is extremely strong, boron (B) in BN reacts with the molten Si to generate an Si-B solid solution expressed by the following expression, so that the BN coating may be degraded.

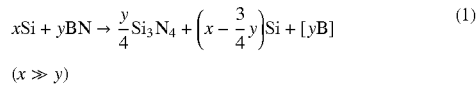

$$x\text{Si} + y\text{BN} \rightarrow \frac{y}{4}\text{Si}_3\text{N}_4 + \left(x - \frac{3}{4}y\right)\text{Si} + [y\text{B}] \qquad (1)$$

$(x \gg y)$

As described above, when B is solid-solved in Si to decompose BN, the function of the sliding layer is lost, the molten Si and the Si fibers are in direct contact with each other. As a result, the matrix and the fibers are separated from each other in growing of cracks, so that breakdown energy decreases.

The present inventor obtained the following knowledge. That is, when a molten Si impregnated into a preform reacts with another B material in advance before the molten Si reaches a BN coat layer on the surface of SiC fibers in reaction sintering to form an Si-B solid solution so as to set the molten Si in an inactive state in the BN coat layer in advance, the molten Si does not reacts with B in the BN coating. In this manner, the BN coating can be protected.

A method of manufacturing a ceramic matrix composite according to the present invention has been made on the basis of the above knowledge. According to this method, a large number of BN-coated SiC continuous fibers are gathered to form yarns, and the yarns are woven to form a two-dimensional or three-dimensional fabric. A preform is formed by using the yarns and the fabric, and C powder is arranged into the gaps between the fibers of the preform to manufacture a compact. There is provided a method of manufacturing a fiber composite ceramic in which a molten Si is impregnated into the compact, and an SiC matrix is formed between the fibers by reaction sintering, characterized in that a region where a B concentration is high is formed around the SiC fibers before the structure is impregnated with a molten Si, and B in the region is solid-solved in Si during reaction sintering so as to prevent B in the BN-coated SiC fibers from being solid-solved in Si.

According to the method of the present invention, the molten Si with which the structure is impregnated advances in the compact while silicificating C in the matrix. Since the molten Si further advances while solid-solving B in the molten Si in a high B-concentration region around the SiC fibers, when the molten Si reaches the BN coating on the surface of the SiC fibers, a large amount of B has been solid-solved in the molten Si. According to this effect, corrosion of the BN coating, i.e., the degree of solid solution of B, is decreased. For this reason, the BN coating on the SiC fiber surface is held relatively sound. As a result, sliding occurs between the matrix and the continuous fibers during growing of cracks, and resistance to growing of cracks after initial breakdown is improved.

In the present invention, as a material constituting the region having a high B-concentration, at least one of boron nitride (BN), boron carbide (B4C), and boron oxide (B203) is applied. As a matter of course, a material obtained by mixing these compounds with each other may be used.

When BN is applied, an Si—B solid solution and SiN are formed by a reaction between BN and molten Si. When B4C is used, SiC is formed in the same manner as described above; when B203 is used, SiO2 is formed.

According to the present invention, an aggregate such as SiC or Si3N4 other than a B compound or a matrix formation component such as C is effectively added.

According to the manufacturing method of the present invention, the B content of the material constituting the region having a high B-concentration is desirably set to be a content having an upper limit as a saturation amount of solid solution in a molten Si impregnated into a preform during reaction sintering. This is because, when the B concentration in a material which has been filled exceeds a saturation amount of solid solution in the molten Si, B is present as a simple substance or a compound, manufacturing cost increases in vain, and the strength of the material is also degraded.

In the manufacturing method of the present invention, one of the step of adhering a material constituting the region having a high B-concentration to the surface of the SiC fibers of the preform as a powder or an organic compound of B and the step of inserting the material into the gap portion between the fibers for forming the matrix together with C powder for reaction sintering can be selected.

In the fiber composite ceramic manufactured as described above which is obtained in such a manner that BN-coated SiC fibers coated with a sliding layer consisting of BN are combined with an SiC matrix as yarns or a fabric, the SIC matrix is formed by reaction sintering using a molten Si and C powder, and an Si-B alloy in which B is solid-solved under saturation amount in Si is formed around the BN-coated SiC fiber.

In the fiber composite ceramic manufactured with the above arrangement, the thickness of the BN coating need not be especially increased, a sufficient sliding effect in growing of cracks can be obtained, and breakdown energy can be increased.

In order to achieve another object of the present invention, the present inventor formed various types of coating layers on fibers used in a ceramic matrix reinforced composite to examine influences of the coating layers on the ceramic matrix composite. As a result, the present inventor obtained the following knowledge. That is, when a coat layer for performing sliding was formed on the surface of the fibers, and a metal compound layer, especially, an oxide layer was formed as a barrier layer on the outside of the coat layer to suppress the coat layer and the matrix layer from reacting with each other, a composite material having high toughness against breakdown could be obtained.

According to still another aspect of the present invention, there is provided a ceramic matrix composite in which ceramic fibers are combined with a ceramic matrix formed by reaction sintering and containing SiC as a main component, a sliding coat layer for decreasing a bonding force between the fibers and the matrix and a barrier layer for coating the outside of the sliding coat layer to suppress a reaction with Si are present on the surface of the fibers as a dual coating, characterized in that the sliding coat layer substantially consists of C or BN, and the barrier layer substantially consists of a compound of one element selected from the group consisting of Ta, Nb, Ti, Zr, and Hf.

In this ceramic matrix composite, a compound constituting the barrier layer is preferably an oxide consisting of $Ta_2O_3$, $Nb_2O_5$, $TiO_2$, $ZrO_2$, or $HfO_2$.

The sliding coat layer formed on the surface of the ceramic fibers is formed to prevent the matrix and the ceramic fibers from being strongly coupled with each other when the sliding coat layer consists of a composite material and to make it possible to perform sliding during bridging or pullout. As a material constituting the sliding coat layer, carbon (C), boron nitride (BN), or the like which gives a sliding function to a portion between the matrix and the fibers, is not affected by a sintering temperature, and is thermally stable is used.

As the barrier layer for suppressing a reaction, a compound of one element selected from Ta, Nb, Ti, Zr, and Hf is effectively used. Of these compounds, $Ta_2O_5$, $Nb_2O_5$, $TiO_2$, $ZrO_2$, or $HfO_2$ is especially effective.

As a method of forming the sliding coat layer and the barrier layer, a general-purpose CVD (chemical vapor deposition) method for transferring a metal component together with a carrier gas such as a nitrogen gas, a hydrogen gas, or an argon gas to decompose and precipitate the metal component on the surface of ceramic fibers heated to a predetermined reaction temperature or more can be employed. The metal component may also be formed by a vacuum deposition method for covering the metal component on the fiber surface or a PVD (physical vapor deposition) method such as a sputtering method or an ion plating method. In addition, a method of forming an organic metal chemical or the like constituting the above material after heat treatment by dipping can be employed.

When ceramic fibers are woven into a predetermined shape to form a stereoscopic fabric, and a sliding coat layer and a barrier layer are formed on the surface of the fabric, the above method can cope with a complex shape.

In this case, the ceramic fibers constituting fibers for a composite material is a reinforcing member for improving the toughness of a matrix used when the composite material is formed. For example, silicon-carbide-base fibers (SiC, SiC/C, Si—C—O, and Si—Ti—C—O), silicon-nitride-base fibers ($Si_3N_4$ and $Si_3N_4/C$), alumina fibers ($Al_2O_3$), zirconia ($ZrO_2$), or the like are available. Sixty-five % or less by volume of the fibers are preferably added to a ceramic material powder constituting the matrix of the composite material. When the fiber content exceeds 65% by volume, it is difficult to uniformly arrange the matrix around the fiber, and the strength characteristics of the composite material are abruptly degraded. The fiber content is preferably set within the range of 10 to 60% by volume.

The diameter and length of each ceramic fiber considerably influences the strength characteristics of the composite material. Continuous fiber, short fiber, or the like having a diameter of 3 to 200 μm can be used. When ceramic fibers each having a diameter of less than 3 μm are used, the reinforcing effect of the matrix base is less; when thick fibers each having a diameter of larger than 200 μm are used, cracks are formed due to the difference between the thermal expansions of the fibers and the matrix, or correspondence to a product shape is degraded.

When the length of each fiber is smaller than 100 μm, cracks are less suppressed from being grown, and the effect of improvement on toughness is also degraded.

The ceramic matrix composite reinforced by the fibers prepared as described above is manufactured by the following steps, for example. More specifically, ceramic material powder or the like is dispersed in a solvent to prepare slurry, and a preform molded by fibers is impregnated with the slurry by using a casting method (including an atmospheric pressure molding method, a pressure molding method, and a reduced-pressure molding method) or the like to prepare a compact having a predetermined shape. When near net shape which is similar to a final product shape.

The resultant compact is sintered in an atmosphere of an inert gas such as a nitrogen gas or an argon gas or in a vacuum state by a reaction sintering method at a temperature falling within the range of 1,400 to 2,000° C. for about 1 to 10 hours to obtain a composite sintered body.

More specifically, the fabric is impregnated with a mixture of SiC fine powder and C by a slip cast method to form a compact, and the compact is impregnated with molten Si at a temperature 1,400 to 2,000° C. to be sintered. The impregnated Si is caused to react with C in the compact, and a cavity portion is buried with secondarily generated SiC to manufacture a dense fiber reinforced composite material.

According to the ceramic matrix composite manufactured by the above method, a sliding coat layer for decreasing the bonding force between the fibers and the matrix to perform sliding is present on the surface of the fiber, and a barrier layer for suppressing the reaction between the coat layer and the matrix layer is present on the coat layer. For this reason, the matrix and the fibers can be prevented from being integrated with each other.

Therefore, the matrix and the ceramic fibers are coupled with each other by appropriate interfacial bonding force. A sliding function between the matrix and the ceramic fibers exhibits, and the breakdown energy of the composite material increases. The sliding function partially exhibits, and a fiber reinforced composite material which is excellent in breakdown toughness value and mechanical strength can be obtained.

When a barrier layer consisting of an oxide of Ta or the like is to be formed by using an organic-metal-base processing solution, the barrier layer can be formed by dipping or the like. For this reason, the operation for forming the barrier can be easily performed, and mass-production properties can also be effectively improved.

DESCRIPTION OF THE PREFERRED EMBODIMENT

Figure 1:
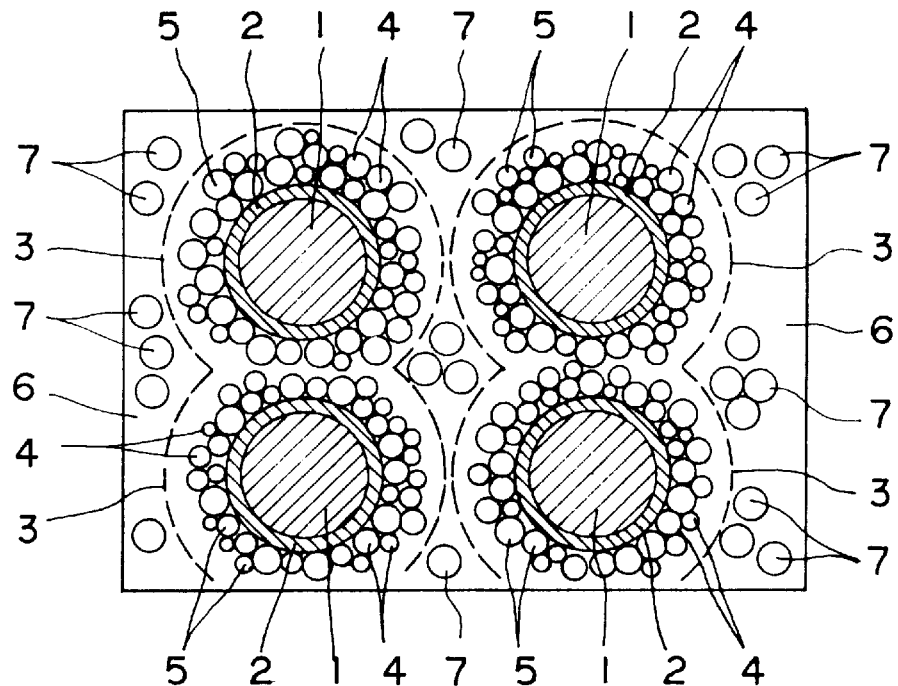
FIG. 1 is a view showing a section of a preform serving as an incomplete compact of a sample manufactured in Embodiment 10 of the present invention.

An embodiment of the present invention will be described below with reference to the accompanying drawings.

EXAMPLE 1

According to this example, as composite fiber, SiC ceramic fibers, i.e., tradename: Hinicaron (filament needle available from Nippon Carbon Co., Ltd. (diameter: 14 μm) were applied. Five hundred fibers obtained as described above were gathered to form a yarn (500 F/Y), and BN was coated on the surface of the fibers by a CVD method, thereby forming a sliding layer. SiC was coated on the outside of the sliding layer by a CVD method, thereby forming a barrier layer for suppressing the sliding layer from being eluted in molten Si during reaction sintering.

Thereafter, the yarns which were dual-coated by the above method were woven to form a plain weave cloth, and a plurality of clothes were stacked to form a preform. This preform was set in a mold consisting a porous resin. In this case, the volume percentage of the fiber was set to be 27%.

The preform set in the mold was impregnated with a ceramic material slurry by a pressure. This ceramic material slurry contained SiC powder having a central grain size of 1 to 3 $\mu$m (70 wt %) and carbon black (30 wt %) as a solid component. The ceramic material slurry was prepared by mixing the solid component (50 wt %), diluted water (47 wt %), and an interfacial active agent (3 wt %).

After the above preform was molded and dried, the preform was brought into contact with B (5 wt %) and molten Si (purity: 99.9 wt %) (B 95 wt %) and heated to 1,430° C. for 5 hours in a vacuum state to be impregnated by molten Si. In this manner, reaction sintered SIC was synthesized in the matrix, thereby obtaining a ceramic matrix composite.

More specifically, in this example, the carbon black served as a C source of SiC generated by reaction sintering between the carbon black and molten Si, and B served as a reactive eluted component with respect to the molten Si. Since the reactive eluted component was present in the molten Si in advance, the BN layer serving as a sliding coat layer could be suppressed from being eluted in the molten Si.

The density of the obtained composite material was 2.99 g/cm3, as shown in Table 1. When the three-point bending strength of a cut sample piece was measured at room temperature, 450 to 510 MPa could be obtained. The composite material exhibited a pseudo stable breakdown behavior inherent in a composite material, i.e., breakdown occurred not to complete rupture at once.

When the cut surface was observed with an SEM, a matrix was uniformly formed around every mono-filament, and uniform immersion sintering was performed. In addition, pullout of fibers was conspicuously observed, and it was apparently confirmed that the BN layer serving as a sliding coat layer on the fiber surface and the SiC layer serving as a barrier layer were sound.

EXAMPLE 2

In this example, the same SIC fibers as those in Example 1 were used, and a BN layer was coated on the fibers as a sliding coat layer on the fiber surface by a CVD method. As a barrier layer outside the sliding coat layer, a carbon layer (C layer) different from the barrier layer in Example 1 was used. This C layer was formed by a CVD method.

As the remaining materials, the same materials as in Example 1 were used, and the same steps as in Example 1 were performed to obtain a ceramic matrix composite.

The density of the obtained composite material was 2.98 g/cm3, as shown in Table 1. When the three-point bending strength of a cut sample piece was measured at room temperature, 420 to 480 MPa could be obtained. The composite material exhibited a pseudo stable breakdown behavior inherent in a composite material, i.e., breakdown occurred not to complete rupture at once.

When the cut surface was observed with an SEM, a matrix was uniformly formed around every mono-filament, and uniform immersion sintering was performed. In addition, pullout of fibers was conspicuously observed, and it was apparently confirmed that the BN layer serving as a sliding coat layer on the fiber surface and the C layer serving as a barrier layer were effected.

EXAMPLE 3

In this example, the same SiC fibers as those in Example 1 were used, and a BN layer was coated on the fibers as a sliding coat layer on the fiber surface by a CVD method. As a barrier layer outside the sliding coat layer, a molybdenum layer (Mo layer) different from the barrier layer in each of the above examples was used. This Mo layer was formed by a sputtering method.

The same preformed as that in each of the above examples was formed by using yarns constituted by the above fibers, and the preform was impregnated with the same ceramic material slurry as described above and dried. The preform was heated in contact with an Si—Mo—B alloy, and infiltration and reaction sintering were performed. In this case, the Mo and B components were components for suppressing the coat layer and the barrier layer from being eluted in molten Si.

The density of the obtained composite material was 3.10 g/cm3, as shown in Table 1. When the three-point bending strength of a cut sample piece was measured at room temperature, 390 to 430 MPa could be obtained. The composite material exhibited a pseudo stable breakdown behavior inherent in a composite material, i.e., breakdown occurred not to complete rupture at once.

When the cut surface was observed with an SEM, a matrix was uniformly formed around every mono-filament, and uniform immersion sintering was performed. In addition, pullout of fibers was conspicuously observed, and it was apparently confirmed that the BN layer serving as a sliding coat layer on the fiber surface and the Mo layer serving as a barrier layer were effected.

EXAMPLE 4

In this example, the same SiC fibers as those in Example 5 were used, and a BN layer was coated on the fibers as a sliding coat layer on the fiber surface by a CVD method. As a barrier layer outside the sliding coat layer, a molybdenum silicide layer (MoSi2 layer) different from the barrier layer in each of the above examples was used. This MoSi2 layer was formed by a sputtering method.

The same preformed as that in each of the above examples was formed by using yarns constituted by the above fibers, and the preform was impregnated with the same ceramic material slurry as described above and dried. The preform was heated in contact with an Si—Mo—B alloy, and infiltration and reaction sintering were performed. In this case, the Mo and Si components were components for suppressing the coat layer and the barrier layer from being eluted in molten Si.

The density of the obtained composite material was 3.11 g/cm3, as shown in Table 1. When the three-point bending strength of a cut sample piece was measured at room temperature, 400 to 440 MPa could be obtained. The composite material exhibited a pseudo stable breakdown behavior inherent in a composite material, i.e., breakdown occurred not to complete rupture at once.

When the cut surface was observed with an SEM, a matrix was uniformly formed around every mono-filament, and uniform immersion sintering was performed. In addition, pullout of fibers was conspicuously observed, and it was apparently confirmed that the BN layer serving as a sliding coat layer on the fiber surface and the MoSi2 layer serving as a barrier layer were effected.

EXAMPLE 5

In this example, the same SiC fibers as those in Example 1 were used, and a niobium layer (Nb layer) was coated on the fibers as a sliding coat layer on the fiber surface by a sputtering method. As a barrier layer outside the sliding coat layer, a tungsten layer (W layer) different from the barrier layer in each of the above examples was used. This W layer was formed by a CVD method.

The same preformed as that in each of the above examples was formed by using yarns constituted by the above fibers, and the preform was impregnated with the same ceramic material slurry as described above and dried. The preform was heated in contact with an Si—Nb—W alloy, and infiltration and reaction sintering were performed. In this case, the Nb and W components were components for suppressing the coat layer and the barrier layer from being eluted in molten Si.

The density of the obtained composite material was 3.12 g/cm3, as shown in Table 1. When the three-point bending strength of a cut sample piece was measured at room temperature, 270 to 320 MPa could be obtained. The composite material exhibited a pseudo stable breakdown behavior inherent in a composite material, i.e., breakdown occurred not to complete rupture at once.

When the cut surface was observed with an SEM, a matrix was uniformly formed around every mono-filament, and uniform immersion sintering was performed. In addition, pullout of fibers was conspicuously observed, and it was apparently confirmed that the Nb layer serving as a sliding coat layer on the fiber surface and the W layer serving as a barrier layer were effected.

EXAMPLE 6

In this example, the same SiC fibers as those in Example 1 were used, and a niobium-yttrium layer (Nb—Y layer) was coated on the fibers as a sliding coat layer on the fiber surface by a sputtering method. As a barrier layer outside the sliding coat layer, a zirconium-yttrium layer (Zr—Y layer) different from the barrier layer in each of the above examples was used. This Zr—Y layer was formed by a CVD method.

The same preformed as that in each of the above examples was formed by using yarns constituted by the above fibers, and the preform was impregnated with the same ceramic material slurry as described above and dried. The preform was heated in contact with a Si—Nb—Zr—Y alloy, and infiltration and reaction sintering were performed. In this case, the Nb, Zr and Y components were components for suppressing the coat layer and the barrier layer from being eluted in molten Si.

The density of the obtained composite material was 3.12 g/cm$^3$, as shown in Table 1. When the three-point bending strength of a cut sample piece was measured at room temperature, 240 to 310 MPa could be obtained. The composite material exhibited a pseudo stable breakdown behavior inherent in a composite material, i.e., breakdown occurred not to complete rupture at once.

When the cut surface was observed with an SEM, a matrix was uniformly formed around every mono-filament, and uniform immersion sintering was performed. In addition, pullout of fibers was conspicuously observed, and it was apparently confirmed that the Nb—Y layer serving as a sliding coat layer on the fiber surface and the Zr—Y layer serving as a barrier layer were effected.

EXAMPLE 7

In this example, the same SiC fibers as those in Example 1 were used, and a alumina layer (Al2O3 layer) was coated on the fibers as a sliding coat layer on the fiber surface by a sol-gel method. As a barrier layer outside the sliding coat layer, a zirconia layer (ZrO2 layer) different from the barrier layer in each of the above examples was used. This ZrO2 layer was formed by a CVD method.

The same preformed as that in each of the above examples was formed by using yarns constituted by the above fibers, and the preform was impregnated with the same ceramic material slurry as described above and dried. The preform was heated in contact with an Si—Al—Zr alloy, and infiltration and reaction sintering were performed. In this case, the Al and Zr components were components for suppressing the coat layer and the barrier layer from being eluted in molten Si.

The density of the obtained composite material was 3.09 g/cm$^3$, as shown in Table 1. When the three-point bending strength of a cut sample piece was measured at room temperature, 920 to 350 MPa could be obtained. The composite material exhibited a pseudo stable breakdown behavior inherent in a composite material, i.e., breakdown occurred not to complete rupture at once.

When the cut surface was observed with an SEM, a matrix was uniformly formed around every mono-filament, and uniform immersion sintering was performed. In addition, pullout of fibers was conspicuously observed, and it was apparently confirmed that the Al2O3 layer serving as a sliding coat layer on the fiber surface and the ZrO2 layer serving as a barrier layer were effected.

EXAMPLE 8

In this example, the same SiC fibers as those in Example 1 were used, and a aluminium nitride layer (AlN layer) was coated on the fibers as a sliding coat layer on the fiber surface by a CVD method. As a barrier layer outside the sliding coat layer, a titanium nitride layer (TiN layer) different from the barrier layer in each of the above examples was used. This TiN layer was formed by a sol-gel method.

The same preformed as that in each of the above examples was formed by using yarns constituted by the above fibers, and the preform was impregnated with the same ceramic material slurry as described above and dried. The preform was heated in contact with an Si—Al—Ti alloy, and infiltration and reaction sintering were performed. In this case, the AL and Ti components were components for suppressing the coat layer from being eluted in molten Si.

The density of the obtained composite material was 3.03 g/cm$^3$, as shown in Table 1. When the three-point bending strength of a cut sample piece was measured at room temperature, 330 to 370 MPa could be obtained. The composite material exhibited a pseudo stable breakdown behavior inherent in a composite material, i.e., breakdown occurred not to complete rupture at once.

When the cut surface was observed with an SEM, a matrix was uniformly formed around every mono-filament, and uniform immersion sintering was performed. In addition, pullout of fibers was conspicuously observed, and it was apparently confirmed that the AlN layer serving as a sliding coat layer on the fiber surface and the TiN layer serving as a barrier layer were effected.

EXAMPLE 9

In this example, the same SiC fibers as those in Example 1 were used, and a Carbon layer (C layer) was coated on the fibers as a sliding coat layer on the fiber surface by a CVD method. As a barrier layer outside the sliding coat layer, a boron carbide layer (B4C layer) different from the barrier layer in each of the above examples was used. This B4C layer was formed by a CVD method.

The same preformed as that in each of the above examples was formed by using yarns constituted by the above fibers, and the preform was impregnated with the same ceramic material slurry as described above and dried. The preform was heated in contact with an Si—B alloy, and infiltration and reaction sintering were performed. In this case, the B components were components for suppressing the coat layer from being eluted in molten Si.

The density of the obtained composite material was 3.00 g/cm$^3$, as shown in Table 1. When the three-point bending strength of a cut sample piece was measured at room temperature, 370 to 400 MPa could be obtained. The composite material exhibited a pseudo stable breakdown behavior inherent in a composite material, i.e., breakdown occurred not to complete rupture at once.

When the cut surface was observed with an SEM, a matrix was uniformly formed around every mono-filament, and uniform immersion sintering was performed. In addition, pullout of fibers was conspicuously observed, and it was apparently confirmed that the C layer serving as a sliding coat layer on the fiber surface and the B4C layer serving as a barrier layer were effected.

Comparative Example 1

A preform corresponding to each of Examples 1 to 9 was impregnated with a metal Si (purity: 99.9 wt %) at 1,430° C. for 5 hours in a vacuum state, and was subjected to reaction sintering.

When a bending test was performed to the resultant sample, although break down did not occur at once in the sample, the brittleness of this sample was larger than that of the sample in each of the examples described above.

When a cut surface was observed with an SEM, the BN coat layer partially reacted with the molten Si, with which the sample was impregnated, to be eliminated, and a portion where the fibers and the matrix were integrated with each other such that the appearance of the fibers was inconspicuous could be detected.

Comparative Example 2

The same preform as that in Example 1 was formed except that an SiC barrier layer was not formed. The preform was impregnated with the same Si—B alloy (B: 5 wt %) and subjected to reaction sintering to obtain a sample.

When a bending test was performed to the resultant sample, although breakdown did not occur at once in the sample, the sample was more brittle.

When a cut surface was observed with an SEM, the BN coat layer partially reacted with the molten Si, with which the sample was impregnated, to be eliminated, and a portion where the fibers and the matrix were integrated with each other such that the appearance of the fibers was inconspicuous could be detected.

TABLE 1

|  | IMPREGNATED OR ADDED ALLOY COMPOSITION (wt %) | DENSITY (g/cm$^3$) | THREE-POINT BENDING STRENGTH AT ROOM TEMPERATURE (MPa) |
| --- | --- | --- | --- |
| EXAMPLE 1 | Si(95)-B(5) | 2.99 | 450~510 |
| EXAMPLE 2 | Si(95)-B(5) | 2.98 | 420~480 |
| EXAMPLE 3 | Si(90)-Mo(5)-B(5) | 3.10 | 390~430 |
| EXAMPLF 4 | Si(90)-Mo(5)-B(5) | 3.11 | 400~440 |
| EXAMPLE 5 | Si(90)-Nb(5)-W(5) | 3.12 | 270~320 |
| EXAMPLE 6 | Si(89)-Nb(5)-Zr(5)-Y(1) | 3.12 | 240~310 |
| EXAMPLE 7 | Si(90)-Al(5)-Zr(5) | 3.09 | 320~350 |
| EXAMPLE 8 | Si(95)-Al(5)-Ti(5) | 3.03 | 330~370 |
| EXAMPLE 9 | Si(95)-B(5) | 3.00 | 370~400 |

EXAMPLE 10

In this example, as a B source for forming a high-concentration B region, BN was used. The BN powder and C powder were mixed with each other in water to form a slip. This slip was stored in a predetermined vessel, a yarn consisting of BN-coated SiC fibers was inserted into the slip and subjected to a dipping operation.

As the SiC fibers, tradename: Hinicaron (filament needle available Prom Nippon Carbon Co., Ltd. (diameter: 14 μm)) was applied. A BN coating serving as a sliding layer and having a thickness of 0.4 m was formed on the surface of the filament, thereby obtaining the BN-coated SiC fibers.

Five hundred BN-coated BN-coated SiC fibers obtained as described above were gathered to form a yarn, and the yarn was dipped in the BN and C slip. The dipped BN-coated SiC fibers were dried to adhere the BN powder and C powder to the surface of the fibers. The amount of adhered BN powder was set to be an amount of solid solution of B saturated with respect to Si (will be impregnated later). This will be described later.

The yarn of the BN-coated SiC fibers to which the BN powder and C powder were adhered was arranged inside a plaster mold. The slip consisting of only C powder was poured into the plaster mold and then dried to fill the C powder in a portion prospectively serving as a matrix in the gap between fibers, thereby obtaining a compact. The compact formed in this example has an almost rectangular parallelopiped (vertical: 40 mm×horizontal: 40 m×thickness: 5 mm), and the volume percentage of the SiC fibers was set to be 25%.

FIG. 1 shows the sectional shape of the obtained compact A. As shown in FIG. 1, a BN coating 2 serving as a sliding layer is formed on the outer peripheral surface of SiC fibers 1, and a predetermined region 3 which is located around the BN coating 2 and indicated by a broken line is a high B-concentration region obtained by adhering BN powder 4 and C powder 5 to the BN coating 2. In addition, C powder 7 is filled in other regions 6.

A molten Si at 1,450° C. was impregnated into the compact A described above to perform reaction sintering between the C powder constituting the compact A and the molten Si, thereby obtaining an SiC fiber composite ceramic sample containing SiC as a matrix.

Figure 2:
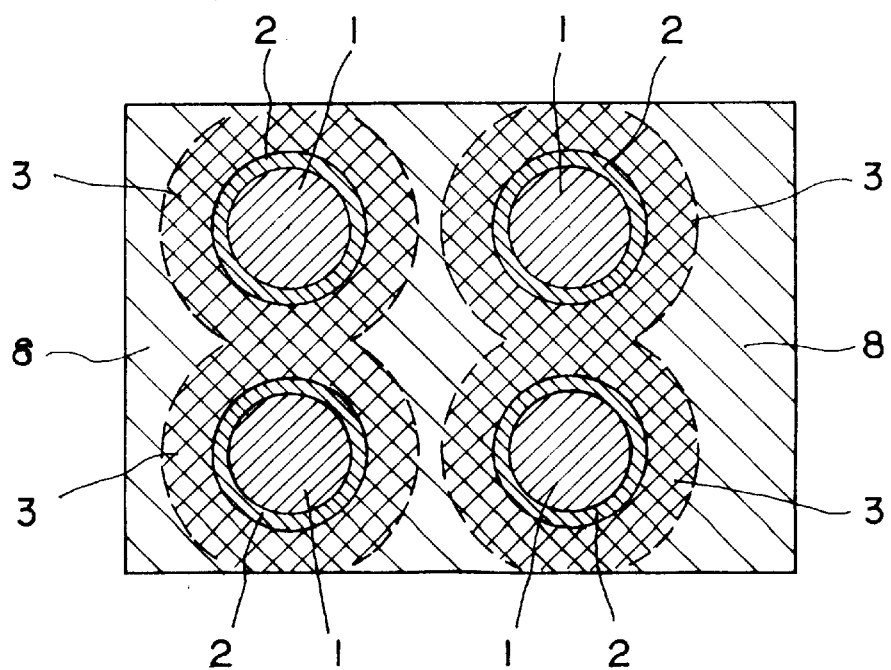
FIG. 2 is a view showing a final section of a sample manufactured in Embodiment 10 of the present invention.

FIG. 2 shows the sectional shape of the resultant sample. As shown in FIG. 2, the BN coating 2 was left on the outer peripheral surface of the SiC fibers 1 in a sound state without being damaged. In the region 3 shown in FIG. 1 and having a high B concentration, an Si—B solid solution was present. For this reason, when reaction sintering was performed by injecting the molten Si, B in the BN powder in the region 3 having a high B concentration was solid-solved in the molten Si to generate an Si—B solid solution. When the molten Si reached the BN coating 2 on the surface of the SiC fibers 1, the Si—B solid solution had been generated, the followings were confirmed. That is, B was not discharged from the BN coating 2 on the SiC fiber surface, and the coating was protected. Referring to FIG. 2, reference numeral 8 denotes an SiC matrix portion generated by reaction sintering.

When the samples (Example 10 and Comparative Example 4) were examined with respect to breakdown energy and a rate of residual fiber, as shown in Table 2, breakdown energy was 1.9, and a rate of residual fiber was 90% in Example 10. In contrast to this, in Comparative Example 3, breakdown energy was 1, and a rate of residual fiber was 40%.

Figure 3:
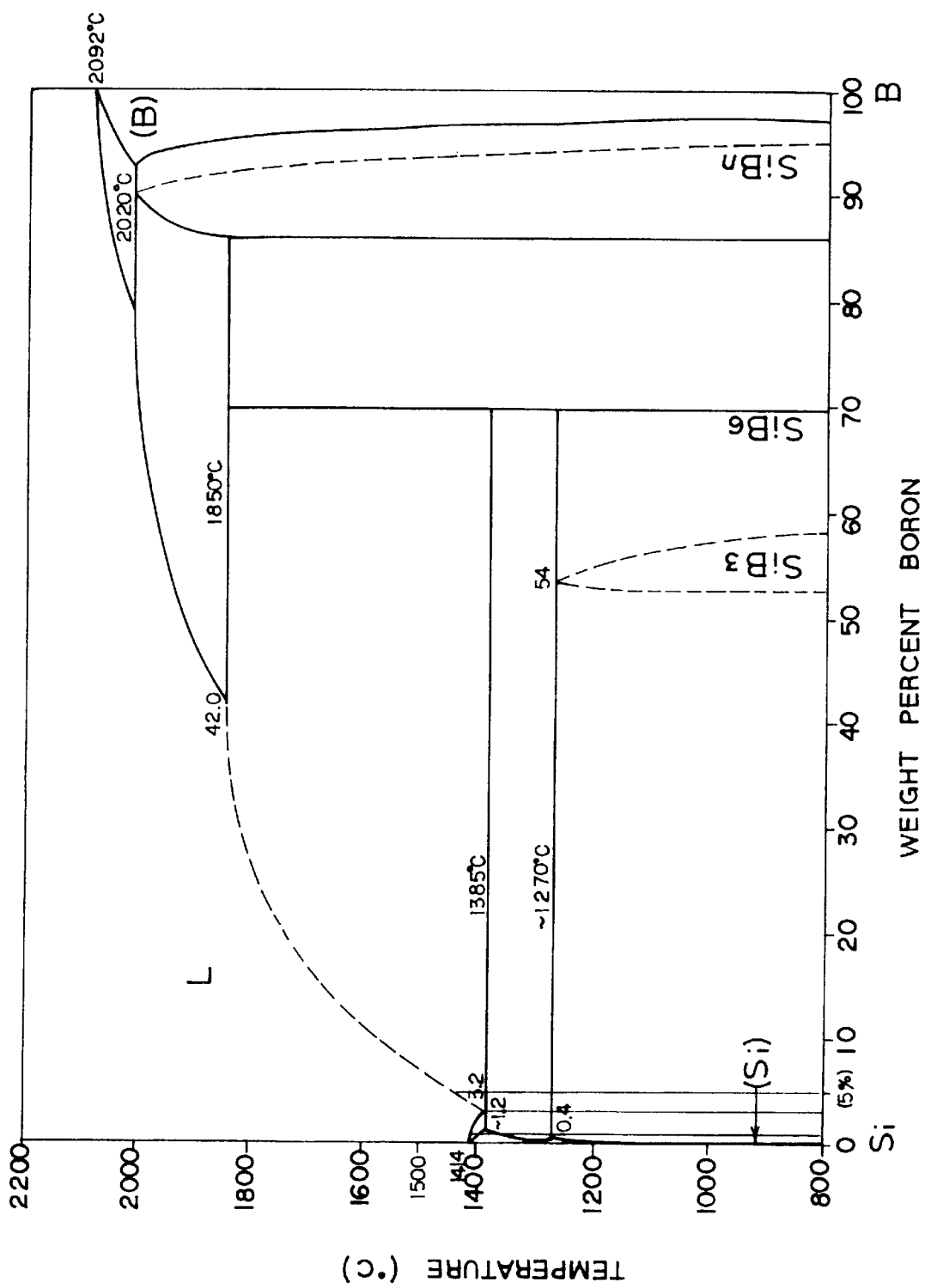
FIG. 3 is a graph showing a silicon (Si)—boron (B) state.

FIG. 3 is a graph showing an Si—B state. As shown in FIG. 5, an amount of B solid-solved in Si depends on a melting temperature. In this example, although the temperature of a molten Si impregnated into a preform for reaction sintering is set to 1,450° C., in this case, a saturation amount of solid solution of B is 5% by weight. When the temperature of the molten Si is 1,390° C., the amount of solid solution of B is 3% by weight; and when the temperature is 1,410° C., the amount is 1% by weight. That is, the amount of solid solution is decreased with a decrease in temperature. For reaction sintering, the molten Si preferably has a high temperature. However, in this case, since a damage rate of fibers increases, an excessive high temperature is not always preferable. Totally, as in this example, the temperature of the molten Si was optimally set to 1,450° C.

EXAMPLES 11 AND 12

According to the same steps as in Example 10, B4C (Example 11) and B2O3 (Example 12) were applied as B components for forming regions each having a high B concentration to prepare samples of Si fiber composite ceramic.

When these samples were examined with respect to breakdown energy and a rate of residual fiber, as shown in Table 2, in each of both Examples 11 and 12, the breakdown energy was 1.8, and the rate of residual fiber was 85%.

EXAMPLE 13

In Example 13, unlike the above examples, a yarn of BN-coated SiC fibers was arranged in a plaster mold without adhering B compound powder to the surface of the BN-coated SiC fiber, a slip of C powder and BN powder whose amount was smaller than an amount of solid solution saturated with respect to Si was poured into the plaster mold, so that the BN powder was present in the gap portion between fibers.

A molten Si was impregnated into a dried preform to perform reaction sintering, thereby preparing a sample.

With respect to this sample, as shown in Table 2, breakdown energy was 1.7, and a rate of residual fiber was 80%.

Comparative Example 3

BN-coated SiC fibers were arranged in a plaster mold, and a slip in which only C powder was solved was poured into the plaster mold. The resultant structure was dried to obtain a preform.

A molten Si was impregnated into the preform to perform reaction sintering, thereby preparing a sample.

As a result, as shown in Table 2, breakdown energy was 1 and a rate of residual fabric was 40%. Therefore, the strength of this sample was lower than those of the samples in the above examples.

Comparative Example 4

In this comparative example, the same material as that in Example 10, and a sample was prepared by the same steps as those in Example 1. However, in this case, a BN powder content for forming a region having a high B concentration was set to be larger than an amount of solid solution saturated with respect to molten Si.

With respect to the sample obtained as the result, breakdown energy was 1.2, and a rate of residual fiber was 85%. More specifically, breakdown strength is degraded because BN is left in the matrix. As a result, breakdown energy may be degraded.

With respect to Examples 10 to 13 and Comparative Examples 3 and 4, examination results are shown in Table 2. Breakdown energy is measured by a three-point bending test, the breakdown energy in Comparative Example 3 is standardized as 1. A rate of residual fOiber is obtained by measuring a rate of residual sound BN-coated SiC fibers by observing the fine structure of a cut surface.

TABLE 2

|  | B SOURCE | STATE IN COMPACT | BREAKDOWN ENERGY | RATE OF RESIDUAL FIBER (%) |
|---|---|---|---|---|
| EXAMPLE 10 | BN | ARROUND LONG FIBER | 1.9 | 90 |
| EXAMPLE 11 | $B_4C$ | ARROUND LONG FIBER | 1.8 | 85 |
| EXAMPLE 12 | $B_2O_3$ | ARROUND LONG FIBER DISPERSE | 1.8 | 85 |
| EXAMPLE 13 | BN | IN MATRIX | 1.7 | 80 |
| COMPARATIVE EXAMPLE 3 | — | — | 1 | 40 |
| COMPARATIVE EXAMPLE 4 | BN | ARROUND LONG FIBER | 1.2 | 85 (BN BECOMES RESIDUAL DEFECT) |

EXAMPLE 14

According to this example, as in Examples 1 and 10, as composite fiber, an SiC ceramic fiber, i.e., tradename: Hinicaron (filament needle available from Nippon Carbon Co., Ltd. (diameter: 14 μm)) was used as a fiber element. A BN layer having a thickness of 0.4 μm was coated on the surface of the fibers by a CVD method, thereby forming a sliding coat layer.

These fibers were dipped in a Ta-base organic metal compound solution (organic-metal-base processing solution (tradename: (Ta-700) available from Nippon Soda Co., Ltd. and used as a functional thin film material) and sintered in the air to form a Ta2O5 barrier layer having a thickness of 0.1 μm. The fibers were woven to form a plain weave cloth, and a plurality of clothes were stacked. The stacked structure was set in a mold consisting a porous resin (Vf=27%), and was impregnated with a matrix material slurry by a pressure.

This ceramic material slurry contained SiC powder having a central grain size of 1 to 3 μm (70 wt %) and carbon black (30 wt %) as a solid component. The ceramic material slurry was prepared by mixing the solid component (50 wt %), diluted water (47 wt %), and an interfacial active agent (3 wt %).

The resultant structure was molded, dried, and heated at 1,430° C. in a vacuum state in contact with melted metal Si (purity: 99.9 wt %) for 5 hours to synthesize reactive sintered SiC on the matrix, thereby obtaining a composite material.

The density of the obtained composite material was 2.9 g/cm³. When the three-point bending strength of a cut sample piece was measured at room temperature, 420 to 460 MPa could be obtained. The composite material exhibited a pseudo stable breakdown behavior inherent in a composite material, i.e., breakdown occurred not to complete rupture at once. When the cut surface was observed with an SEM, a matrix was uniformly formed around every mono-filament, and uniform immersion sintering was performed. In addition, pullout of fibers was conspicuously observed, and it was apparently confirmed that the BN layer serving as a sliding coat layer was sound.

EXAMPLE 15

In this example, the same SiC-base ceramic fibers as in Example 14 were used as a fiber material. A BN layer having a thickness of 0.4 μm was coated on the surface of the fibers by a CVD method, thereby forming a sliding coat layer.

These fibers were dipped in an Nb-base organic metal compound solution and sintered in the air to form a Nb2O5 barrier layer having a thickness of 0.2 μm. The fibers were woven to form a plain weave cloth, and a plurality of clothes were stacked. The stacked structure was set in a mold consisting a porous resin (Vf=27%), and was impregnated with a matrix material slurry by a pressure. The ceramic material slurry was the same as in Example 14.

The resultant structure was molded, dried, and heated at 1,430° C. in a vacuum state in contact with melted metal Si (purity: 99.9 wt %) for 5 hours to synthesize reactive sintered SiC on the matrix, thereby obtaining a composite material.

The density of the obtained composite material was 2.9 g/cm³. When the three-point bending strength of a cut sample piece was measured at room temperature, 400 to 450 MPa could be obtained. The composite material exhibited a pseudo stable breakdown behavior inherent in a composite material, i.e., breakdown occurred not to complete rupture at once. When the cut surface was observed with an SEM, a matrix was uniformly formed around every mono-filament, and uniform immersion sintering was performed. In addition, pullout of fibers was conspicuously observed, and it was apparently confirmed that the BN layer serving as a sliding coat layer was sound.

EXAMPLE 16

In this example, the same SiC-base ceramic fibers as in Example 14 were used as a fiber material. A BN layer having a thickness of 0.4 μm was coated on the surface of the fibers by a CVD method, thereby forming a sliding coat layer.

These fibers were dipped in a Ti-base organic metal compound solution and sintered in the air to form a TiO2 barrier layer having a thickness of 0.2 μm. The fibers were woven to form a plain weave cloth, and a plurality of clothes were stacked. The stacked structure was set in a mold consisting a porous resin (Vf=27%), and was impregnated with a matrix material slurry by a pressure. The ceramic material slurry was the same as in Example 14.

The resultant structure was molded, dried, and heated at 1,430° C. in a vacuum state in contact with melted metal Si (purity: 99.9 wt %) for 5 hours to synthesize reactive sintered SiC on the matrix, thereby obtaining a composite material.

The density of the obtained composite material was 2.9 g/cm³. When the three-point bending strength of a cut sample piece was measured at room temperature, 330 to 380 MPa could be obtained. The composite material exhibited a pseudo stable breakdown behavior inherent in a composite material, i.e., breakdown occurred not to complete rupture at once. When the cut surface was observed with an SEM, a matrix was uniformly formed around every mono-filament, and uniform immersion sintering was performed. In addition, pullout of fibers was conspicuously observed, and it was apparently confirmed that the BN layer serving as a sliding coat layer was sound.

EXAMPLE 17

In this example, the same SiC-base ceramic fibers as in Example 14 were used as a fiber material. A BN layer having a thickness of 0.4 μm was coated on the surface of the fibers by a CVD method, thereby forming a sliding coat layer.

These fibers were dipped in a Zr-base organic metal compound solution and sintered in the air to form a ZrO2 barrier layer having a thickness of 0.2 μm. The fibers were woven to form a plain weave cloth, and a plurality of clothes were stacked. The stacked structure was set in a mold consisting a porous resin (Vf=27%), and was impregnated with a matrix material slurry by a pressure. The ceramic material slurry was the same as in Example 9.

The resultant structure was molded, dried, and heated at 1,430° C. in a vacuum state in contact with melted metal Si (purity: 99.9 wt %) for 5 hours to synthesize reactive sintered SiC on the matrix, thereby obtaining a composite material.

The density of the obtained composite material was 2.9 g/cm$^3$. When the three-point bending strength of a cut sample piece was measured at room temperature, 320 to 360 MPa could be obtained. The composite material exhibited a pseudo stable breakdown behavior inherent in a composite material, i.e., breakdown occurred not to complete rupture at once. When the cut surface was observed with an SEM, a matrix was uniformly formed around every mono-filament, and uniform immersion sintering was performed. In addition, pullout of fibers was conspicuously observed, and it was apparently confirmed that the BN layer serving as a sliding coat layer was sound.

EXAMPLE 18

In this example, the same SiC-base ceramic fibers as in Example 14 were used as a fiber material. A BN layer having a thickness of 0.4 μm was coated on the surface of the fibers by a CVD method, thereby forming a sliding coat layer.

These fibers were dipped in a Hf-base organic metal compound solution and sintered in the air to form a HfO2 barrier layer having a thickness of 0.2 μm. The fibers were woven to form a plain weave cloth, and a plurality of clothes were stacked. The stacked structure was set in a mold consisting a porous resin (Vf=27%), and was impregnated with a matrix material slurry by a pressure. The ceramic material slurry was the same as in Example 14.

The resultant structure was molded, dried, and heated at 1,430° C. in a vacuum state in contact with melted metal Si (purity: 99.9 wt %) for 5 hours to synthesize reactive sintered SiC on the matrix, thereby obtaining a composite material.

The density of the obtained composite material was 2.9 g/cm$^3$. When the three-point bending strength of a cut sample piece was measured at room temperature, 330 to 390 MPa could be obtained. The composite material exhibited a pseudo stable breakdown behavior inherent in a composite material, i.e., breakdown occurred not to complete rupture at once. When the cut surface was observed with an SEM, a matrix was uniformly formed around every mono-filament, and uniform immersion sintering was performed. In addition, pullout of fibers was conspicuously observed, and it was apparently confirmed that the BN layer serving as a sliding coat layer was sound.

Other Example

When a barrier layer consisting of a compound of at least one element selected from Ta, Nb, Ti, Zr, or Hf except for the oxides described above was formed on fibers in the same manner as described above, the same effect as in Examples 14 to 18 could be obtained.

Comparative Example 5

A composite material was formed in the same manner as in Example 14 except that the same fibers as in Example 9 were coated with only a single BN layer without being coated with a barrier layer.

As a result, when a three-point bending test was performed to the composite material, although breakdown did not occur at once in the composite material, the composite material exhibited a breakdown behavior which is more brittle than that of a composite material on which a protective reaction barrier was coated. When the cut surface of a test piece after the test was observed, a BN coat layer partially reacted with molten Si to be eliminated, and a portion where the fibers and the matrix were integrated with each other could be detected.

Comparative Example 6

A composite material was formed in the same manner as in Example 14 except that the same fibers as in Example 9 were coated with only a single carbon layer without being coated with a barrier layer.

As a result, when a three-point bending test was performed to the composite material, although breakdown did not occur at once in the composite material, the composite material exhibited a breakdown behavior which is more brittle than that of a composite material on which a protective reaction barrier was coated. When the cut surface of a test piece after the test was observed, a carbon coat layer partially reacted with molten Si to be eliminated, and a portion where the fibers and the matrix were integrated with each other could be detected.

What is claimed is:

1. A ceramic matrix composite comprising:
   a ceramic matrix comprising SiC as a main component, the SiC being formed by reaction sintering of molten Si and C powder;
   ceramic fibers within said ceramic matrix wherein said ceramic fibers are selected from the group consisting of silicon-carbide fibers, silicon-nitride fibers, alumina fibers, and zirconia fibers, and wherein the percentage of said fibers ranges from 10% by volume to 60% by volume of said composite;
   a sliding coating layer covering the ceramic fibers for facilitating sliding between said ceramic matrix and said ceramic fibers, and wherein said sliding coating layer comprises boron nitride; and
   a reaction-preventing component in said ceramic matrix for preventing said sliding coating layer from reacting with the molten Si during reaction sintering, wherein said reaction-preventing component comprises a compound or element from said sliding coating layer and said reaction-preventing component exists within the ceramic matrix in a compound with Si, said Si compound resulting from reaction sintering, and further wherein the reaction-preventing component comprises B, and said Si compound comprises a Si—B alloy surrounding said sliding coating layer, and further wherein at least the Si—B alloy surrounding said sliding coating layer has a B concentration less than or equal to the solid saturation value of the B in the molten Si.

2. A ceramic matrix composite according to claim 1, wherein the Si—B alloy region surrounding said sliding coating layer has a higher B concentration than the other region in the matrix.

3. A ceramic matrix composite comprising:

a ceramic matrix comprising SiC as a main component, the SiC being formed by reaction sintering of molten Si and C powder;

ceramic fibers within said ceramic matrix wherein said ceramic fibers are selected from the group consisting of silicon-carbide fibers, silicon-nitride fibers, alumina fibers, and zirconia fibers, and wherein the percentage of said fibers ranges from 10% by volume to 50% by volume of said composite;

a sliding coating layer covering the ceramic fibers, for facilitating sliding between said ceramic matrix and said ceramic fibers, and wherein said sliding coating layer comprises boron nitride; and a barrier layer for coating an outer surface of said sliding coating layer to suppress a reaction between said sliding coating layer and Si infiltration of the fibers, wherein said barrier layer comprises a second coating on the fiber surface and is selected from the group consisting of Si, C, Mo, and $MoSi_2$;

a reaction-preventing component in said ceramic matrix for preventing said sliding coating layer from reacting with the molten Si during reaction sintering, wherein said reaction-preventing component comprises a compound or element from said sliding coating layer and said reaction-preventing component exists within the ceramic matrix in a compound with Si, said Si compound resulting from the reaction sintering, and further wherein the reaction-preventing component comprises B, and said Si compound comprises a Si—B alloy surrounding barrier coating layer, and further wherein at least the Si—B alloy surrounding barrier coating layer surrounding said barrier layer has a B concentration less than or equal to the solid saturation value of the B in the molten Si.

4. A ceramic matrix composite according to claim 3, wherein the Si—B alloy layer surrounding said barrier layer has a higher B concentration than the other region in the matrix.

5. A method of manufacturing a ceramic matrix composite comprising the steps of:

forming a sliding coating layer on surfaces of ceramic fibers by a method selected from the group consisting of CVD, sputtering, and sol-gel, wherein said sliding coating layer consists of boron nitride, and wherein said ceramic fibers are selected from the group consisting of silicon-carbide fibers, silicon-nitride fibers, alumina fibers, and zirconia fibers;

forming a yarn by gathering said coated fibers;

forming a preform by casting said yarn in a mold;

adding C powder to said preform;

heating Si and a material comprising at least one selected from the group consisting of BN, $B_4C$, and $B_2O_3$ to fuse said Si and said material; and infiltrating the resulting molten Si and molten material into said preform, thereby reaction sintering said molten Si and said C powder and reacting said molten Si and said material with each other before said molten Si and said sliding coating layer react with each other, thus preventing said sliding coating layer from eluting in the molten Si.

6. A method of manufacturing a ceramic matrix composite comprising the steps of:

forming a sliding coating layer on surfaces of ceramic fibers by a method selected from the group consisting of CVD, sputtering, and sol-gel, wherein said sliding coating layer consists of boron nitride, and further wherein said ceramic fibers are selected from the group consisting of silicon-carbide fibers, silicon-nitride fibers, alumina fibers, and zirconia fibers;

forming a barrier layer covering said sliding coating layer by a method selected from the group consisting of CVD, sputtering, and sol-gel, wherein said barrier layer is selected from the group consisting of SiC, C, Mo, and $MoSi_2$;

forming a yarn by gathering said coated fibers;

forming a preform by casting said yarn in a mold;

adding C powder to said preform;

heating Si and a material comprising at least one selected from the group consisting of BN, $B_4C$, and $B_2O_3$ to fuse said Si and said material; and infiltrating the resulting molten Si and molten material into said preform, thereby reaction sintering said molten Si and said C powder, and reacting said molten Si and said material with each other before said molten Si and said barrier layer react with each other, thus preventing said barrier layer from eluting in the molten Si.

* * * * *